United States Patent [19]

Ohmura

[11] Patent Number: 4,527,874
[45] Date of Patent: Jul. 9, 1985

[54] DUAL LENS CAMERA

[76] Inventor: Hiroshi Ohmura, c/o Fuji Photo Film Co., Ltd., 2-26-30, Nishiazabu, Minato-ku, Tokyo, Japan

[21] Appl. No.: 589,012

[22] Filed: Mar. 13, 1984

[30] Foreign Application Priority Data

Mar. 18, 1983 [JP] Japan ............................... 58-38348[U]

[51] Int. Cl.³ ................................................ G03B 3/00
[52] U.S. Cl. ................................................ 354/195.12
[58] Field of Search ..................... 354/195.12; 352/142

[56] References Cited

U.S. PATENT DOCUMENTS 4,341,449  7/1982  Iwata et al. ................. 354/195.12 X
4,352,546 10/1982  Iwata et al. ................. 354/195.12 X

FOREIGN PATENT DOCUMENTS 156053  7/1962  U.S.S.R. ......................... 354/195.12

Primary Examiner—John Gonzales
Attorney, Agent, or Firm—Young & Thompson

[57] ABSTRACT

A dual lens camera having a relatively long focus lens and a relatively short focus lens either one of which is selected for telephotographing and wide angle photographing is provided with a movable mirror and an exposure aperture located behind the short focus lens, and a fixed mirror located behind the long focus lens with an angle of inclination more than a right angle relative to the optical axis thereof. Upon wide angle photographing, the light passed through the short focus lens can travels straightly to the exposure aperture. When selecting the long focus lens to effecting telephotographing, the movable mirror is pivoted to position in front of the exposure aperture so as to reflect the reflected light by the fixed mirror and thereby organize a Z-shaped optical path for the long focus lens. Simultaneously, the short focus lens is shifted in the direction perpendicular to the optical axis thereof for the purpose of the pivotal movement of the movable mirror without any interference therewith.

8 Claims, 4 Drawing Figures

DUAL LENS CAMERA

BACKGROUND OF THE INVENTION

The present invention relates to a dual lens camera and more particularly, to a dual lens camera provided with a long focus lens and a short focus lens which are arranged side by side and selectively used.

There have been known two types of cameras with selectively usable lenses, one of which is characterized by a converter lens which is replaceably put in the optical axis a master lens and the other is so constructed that a long focus lens (hereinafter referred to as a "telephoto lens") and short focus lens (hereinafter referred to as a "wide angle lens") which are arranged side by side are selected by a movable mirror. The present invention is directed to an improvement of the latter type which is characterized by an increased telephoto-effect.

The latter type of dual lens camera disclosed in Japanese Pat. unexamined publication No. 143013/'79 is shown in FIG. 1 by way of example. There is shown a camera provided with a wide angle lens 2 and a telephoto lens 3 which are arranged side by side in a front part of camera housing 1. Behind the lenses 2 and 3 a movable and a fixed mirror 4 and 5 are disposed, respectively, in such a way that the reflective surface of each mirror intersects the optical axis of the respective lens at an angle of 45°. Rearward the movable mirror 4 there are provided in the camera housing a plate 8 with an exposure aperture 8a provided, a shutter member 9, a film 10 and a film pressure plate 12 held on a back cover 11.

In the camera mentioned above, when the telephoto lens 3 is selected to be used, the movable mirror 4 is shifted to a position shown by a solid line so as to organize a photographing optical path for the telephoto lens 3. Thus, the light passed through the telephoto lens 3 changes its direction at right angles by being completely reflected by the fixed mirror 5 to travel toward the movable mirror 4 so as to further change its direction rearwardly by also being completely reflected at right angles thereby. The reflected light will reach the film 10 passing through the exposure aperture 8a defined in the plate 8 and the shutter 9 which is opening. On the other hand, when the wide angle lens is selected to be used, the movable mirror 4 is returned to the position shown by a dotted line to allow the light passed through the wide angle lens 2 to travel straightly up to the film 10 and intercepts the light reflected by the fixed mirror 5.

Although the lenses of aforementioned type of cameras can be selected easily by shifting the movable mirror 4, there is a shortcoming in such cameras that, when the telephoto lens 3 is selected to be used, it is hard to take a picture with sufficiently satisfactory telephoto-effect because of the fact that a long optical path length is not enssured owing to its crank-shaped optical path. To solve the shortcoming, saying in differently, to emphasize telephoto-effect, it is necessary to keep the two lenses 2 and 3 apart as far as possible. This solution, however, makes such cameras bulky and whereas does not satisfy a requirement for miniaturization of camera.

SUMMARY OF THE INVENTION

It is therefore an object of the present invention to provide a camera with selectively usable lenses which is miniturized.

It is another object of the present invention to provide a camera with selectively usable lenses in which an optical path length necessary for a telephoto lens can be enssured without keeping the optical axis of a telephoto lens greatly away from the line which intersects the center of an exposure aperture.

It is further object of the present invention to provide a camera with selectively usable lenses in which, upon selecting a telephoto lens, a wide angle lens is removed out of the moving course of a movable mirror so as not to be hit by the movable mirror.

It is still further object of the present invention to provide a camera with selectively usable lenses in which a wide angle lens is shifted in cooperation with a movable mirror for an easy lens selecting operation.

For accomplishing these objects of the present invention, there is provide a camera with selectively usable lenses in which a movable mirror and a fixed mirror are disposed in such a way that each mirror reflects light incident thereupon at an angle less than a right angle so as to form a Z-shaped optical path for telephotographing. This formation of optical path makes it possible to enssure a long optical path length which is necessary for a satisfactory telephoto-effect without rendering the camera bulky. In a preferred embodiment of the present invention, in order to make the camera body small in depth without cutting a part of the optical path between the movable mirror and a film plane short, a wide angle lens is so incorporated in the camera as to shift away from the movable mirror when the latter pivotably moves toward the former. The pivotal motion of the movable mirror is caused in cooperation with a shifting operation of the wide angle lens.

BRIEF DESCRIPTION OF THE DRAWINGS

The present invention itself, together with other objects and advantages thereof will be best understood from the following detailed description of the illustrated embodiment when read in conjunction with the accompanying drawings, in which.

DETAILED DESCRIPTION OF THE INVENTION

Figure 1:
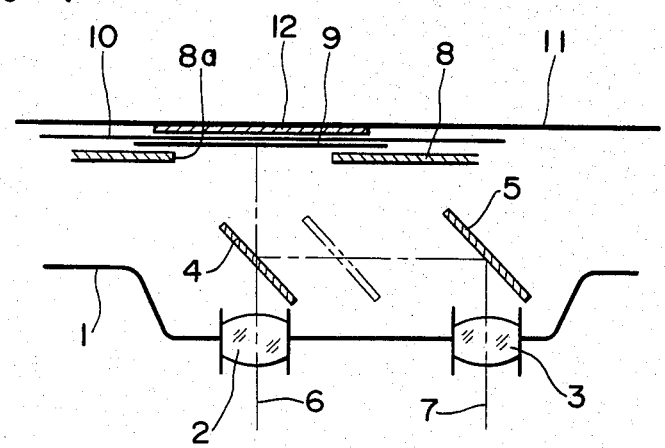
FIG. 1 is a schematic illustration showing a conventional camera with selectively usable lenses.
Figure 2:
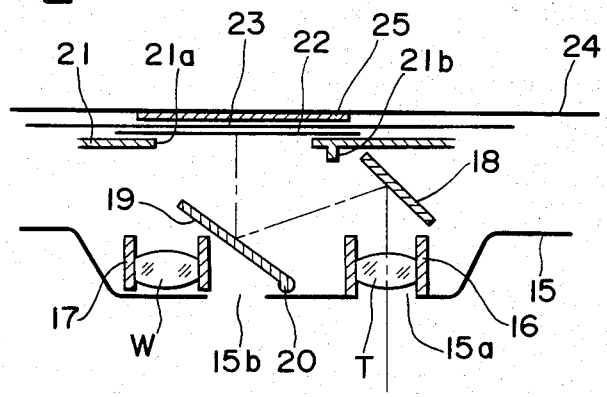
FIG. 2 is a schematic illustration showing a preferred embodiment of a camera with selectively usable lenses according to the present invention, in which a telephoto lens is selected to be used.
Figure 3:
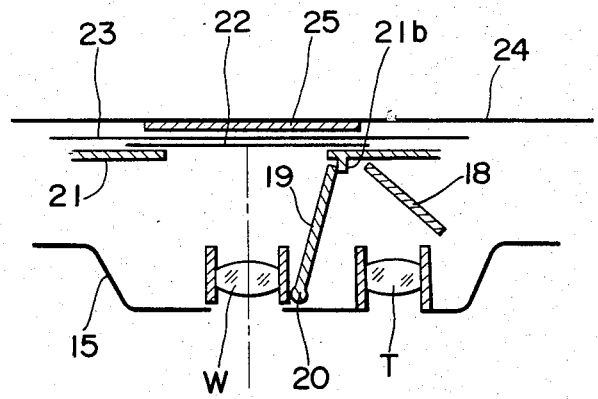
FIG. 3 is a schematic illustration similar to FIG. 2, in which a wide angle lens is selected to be used.

Referring now to FIGS. 2 and 3, there is shown a camera housing 15 having a front wall includes two openings 15a and 15b formed therein. Aligned with the opening 15a a telephoto lens T included in a lens barrel 16 is stationarily disposed in the camera housing 15. On the other hand, behind the other opening 15b a wide angle lens W included in a lens barrel 17 is shiftably disposed in the camera housing. A fixed mirror provided behind the lens barrel 16 of the telephoto lens T to reflect the light passed through the telephoto lens T at an angle less than a right angle and then directs the reflected light thereby to a movable mirror 19 which will be described hereafter. The movable mirror 19 is pivotally mounted on a shaft 20 to be shiftable between a position shown in FIG. 2 at which the movable mirror 19 intercepts the light passing through the opening 15b and reflects the reflected light by the fixed mirror 18 rearward and a position shown in FIG. 3 at which the movable mirror 19 allows the light passed through the wide angle lens to reach the film 23 and intercepts the reflected light by the fixed mirror 18. At the position shown in FIG. 2, the movable mirror 19 is held to be parallel with the fixed mirror 18, so as to make the reflection angles of the two mirrors 18 and 19 equal to each other. Designated at 21 is an aperture flame plate which is provided with an exposure aperture 21a and a projection 21a sticking out therefrom for stopping the top of the movable mirror 19. Behind the aperture flame plate 21 there are arranged a shutter member 22, a film 23 and a film pressure plate 25 held on a back cover 24, in order.

As shown in FIG. 2, when the telephoto lens T is selected for telephotographing, the movable mirror 19 organizes a Z-shaped optical path in cooperation with the fixed mirror 18, so that the light passed through the telephoto lens is reflected by mirrors 18 and 19 in order to reach the film 23 passing through the shutter member 22 which is opening. Apparent from the above, since the mirrors 18 and 19 reflect the incident light at an angle less than a right angle, respectively, to organize a Z-shaped optical path when the telephoto lens is selected to be used, the optical path length from the telephoto lens T to the film 23 can be made sufficiently longer. Consequently, a telephoto-effect is sufficiently enabled without keeping the telephoto lens T apart greatly from the center of the exposure aperture 21a.

Referring now to FIG. 3 showing the camera with the wide angle lens W selected for wide angle photographing, the wide angle lens W is shifted to the right to be aligned with the opening 15a and in cooperation with the shift of the wide angle lens W, the movable mirror 19 is pivoted to intercept the optical path of the telephoto lens T.

It may be considered to stationarily dispose the wide angle lens W in alignment with the opening 15b. Such construction requires to put the shaft 20 to the film 23. Consequently, it is preferable to make the wide angle lens W shiftable for the purpose of rendering the camera housing 15 small in depth.

Figure 4:
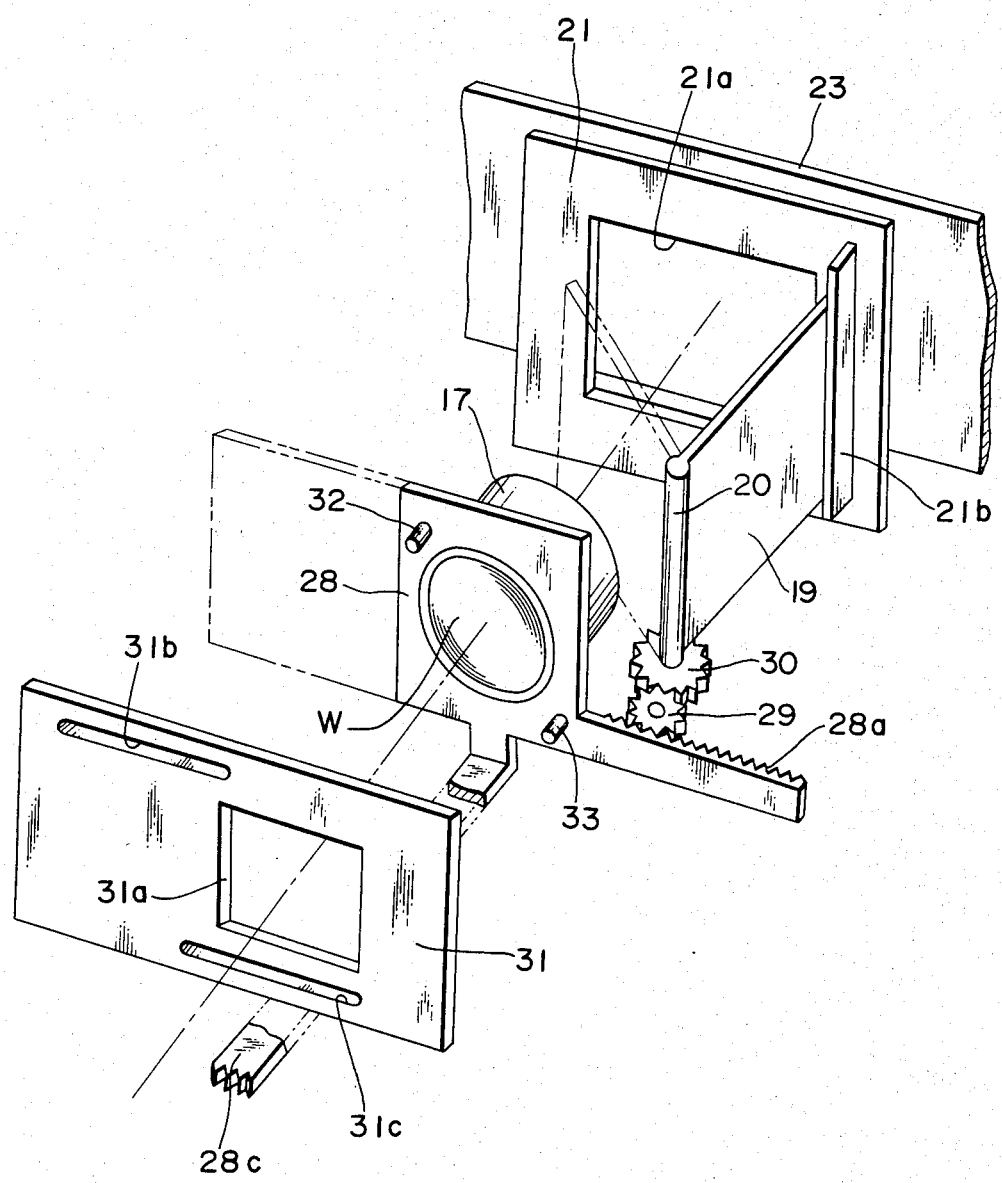
FIG. 4 is a perspective view of an example of a lens selecting mechanism which is incorporated to the camera shown in FIGS. 2 and 3.

FIG. 4 is shows an example of a lens selecting mechanism. A sliding plate 28 on which the wide angle lens W is mounted is provided on a part thereof with a rack gear 28a which is operationally cooperated with a gear 30 through an idler gear 29 so that the gear 30 is caused to rotate as a result of the sliding motion of the sliding plate 28. The gear 30 is fixedly attached to the bottom end of the shaft 20 on which the movable mirror 19 is pivoted. The sliding motion of the sliding plate 28 to right causes the movable mirror 19 to pivot clockwise and go away from the optical path of the wide angle lens W.

In front of the sliding plate 28 an ornamental plate 31 which is formed with an opening 31a and two guide slots 31b and 31c is stationarily disposed in the camera housing 15. Fitted with the respective guide slots 31b and 31c are pins 32 and 33 mounted on the ornamental plate 31.

Pushing a knob 28c extending from the sliding plate 28 to right, the sliding plate 28 is shifted to the position shown by a solid line and simultaneously the movable mirror 19 is pivoted clockwise about the shaft 20, so as to allow the light passed through the wide angle lens W to travel to the film 23. On the other hand, the motion of the knob 28c to left caused the wide angle lens W and the movable mirror 19 to simultaneously move toward the positions shown by dotted lines, respectively, so as to intercept the opening 31a.

While the present invention has been particularly shown and described with reference to a combination of a long focus lens (telephoto lens) and a short focus lens (wide angle lens), the application is never limited to it only. The present invention is equally applicable to other various combinations of lenses, for instance a telephoto lens and a standard lens, a standard lens and a wide angle lens, and the like. Further, while the present invention has been described in connection with specific examples thereof, other modifications will become apparent to those skilled in the art upon a study of the specification drawings and claims.

What is claimed is:

1. A dual lens camera which is provided with a relatively long focus lens and a relatively short focus lens which are arranged side by side and either one of which is selected, an exposure aperture located behind said short focus lens, a fixed mirror located behind said long focus lens, a movable mirror which is pivotally movable between a first position where it positions in front of said exposure aperture and a second position where it positions out of the front of said exposure aperture, said movable mirror organizing an optical path for said long focus lens at said first position to direct the light reflected by said fixed mirror to said exposure aperture and another optical path for said short focus lens at said second position to allow the light passed through said short focus lens travel straightly to said exposure aperture, the improvement characterized in that said fixed mirror is so inclined as to turn a optical path of said long focus lens at an angle less than a right angle; and said movable mirror at said first position is parallel to said fixed mirror so as to organize a Z-shaped optical path for said long focus lens.

2. A dual lens camera as defined in claim 1 in which a shaft on which said movable mirror is pivotally mounted is located between said long focus lens and short focus lens.

3. A dual lens camera as defined in claim 2 in which said movable mirror intercepts the light passed through said short focus lens at said first position and the reflected light by said fixed mirror at said second position, so as to prevent said light from entering said exposure aperture in either case.

4. A dual lens camera as defined in claim 2 in which said short focus lens is shiftable between a first position where its optical axis is aligned with the center of said exposure aperture and a second position where it is removed out of the front of said exposure aperture and in the direction opposite to said long focus lens.

5. A dual lens camera as defined in claim 4 in which said movable mirror is pivotally moved from said second position to said first position in cooperation with the motion of said short focus lens from said first position to said second position.

6. A dual lens camera as defined in claim 5 in which said short focus lens is shiftable in a direction perpendicular to the optical axis thereof.

7. A dual lens camera as defined in claim 6 in which said short focus lens is mounted on a sliding plate with an operation knob provided.

8. A dual lens camera as defined in claim 7 in which said sliding plate is provided with a rack gear which is cooperated with a pinion gear fixedly attached to said shaft through an idler gear.

* * * * *